No. 733,358. PATENTED JULY 7, 1903.
C. H. VEEDER.
TACHOMETER.
APPLICATION FILED FEB. 18, 1903.
NO MODEL. 4 SHEETS—SHEET 1.
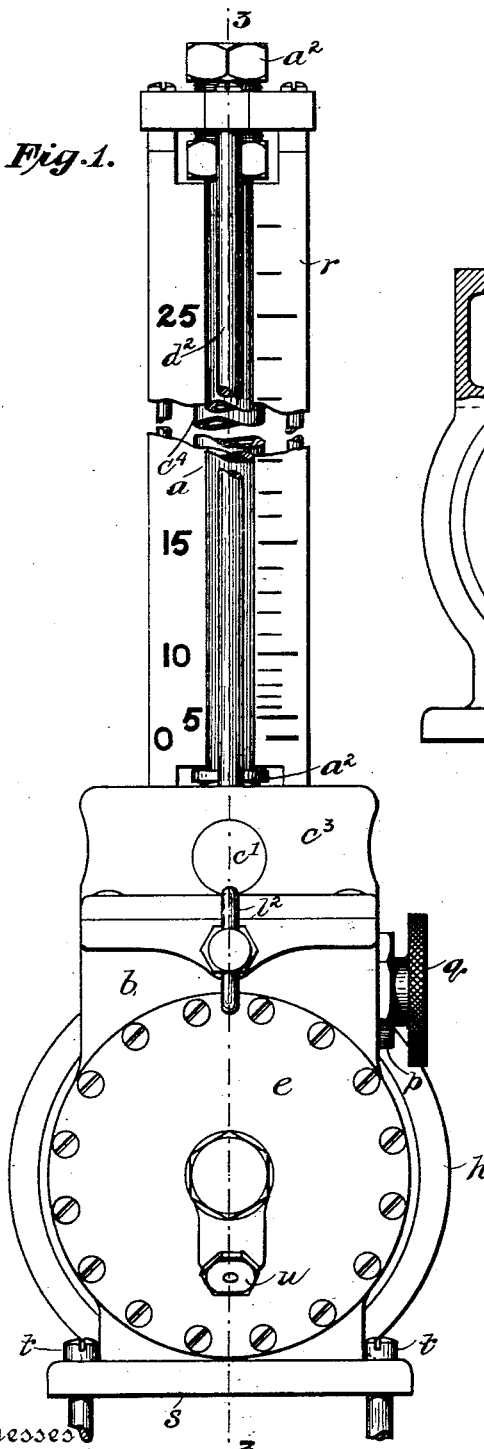
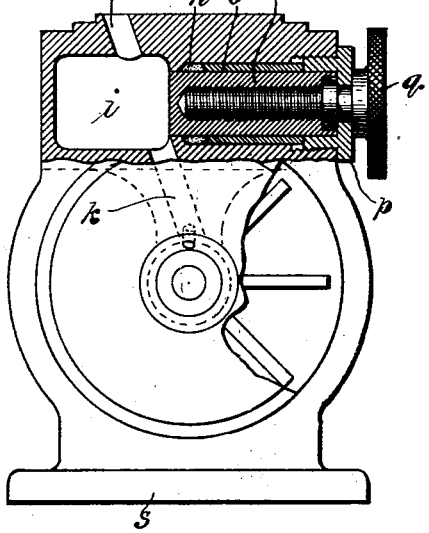
Witnesses
Inventor
Curtis Hussey Veeder
By his Attorneys, No. 733,358. PATENTED JULY 7, 1903.
C. H. VEEDER.
TACHOMETER.
APPLICATION FILED FEB. 18, 1903.
NO MODEL. 4 SHEETS—SHEET 2.
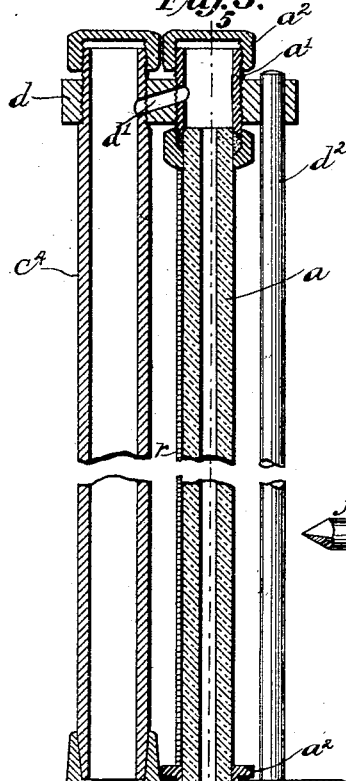
Fig.3.
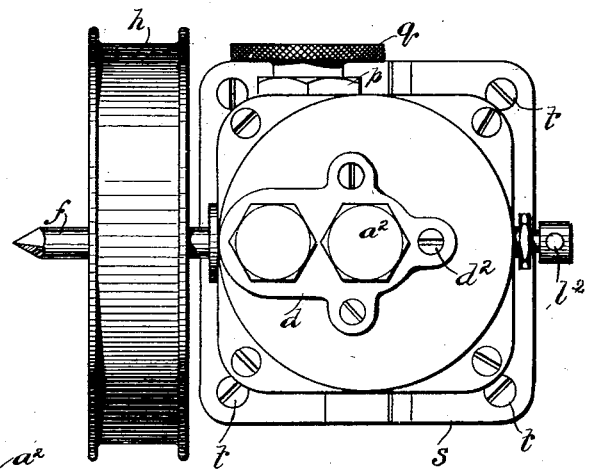
Fig.4.
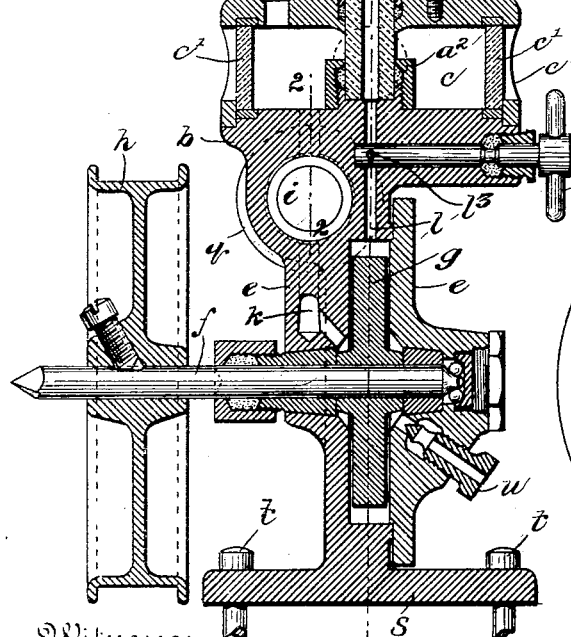
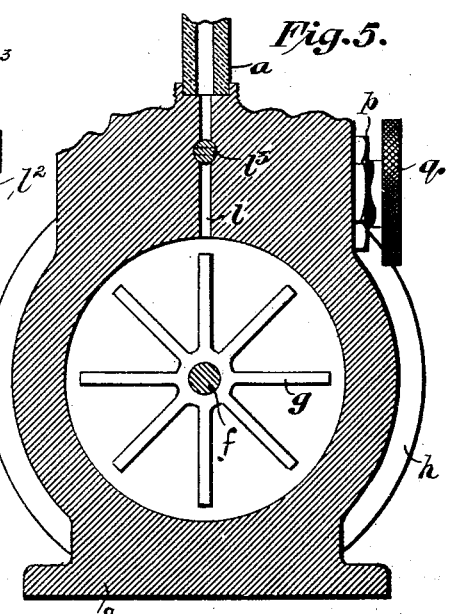
Fig.5.
Witnesses
Inventor
Curtis Hussey Veeder
By his Attorneys
Redding, Kiddle & Greeley

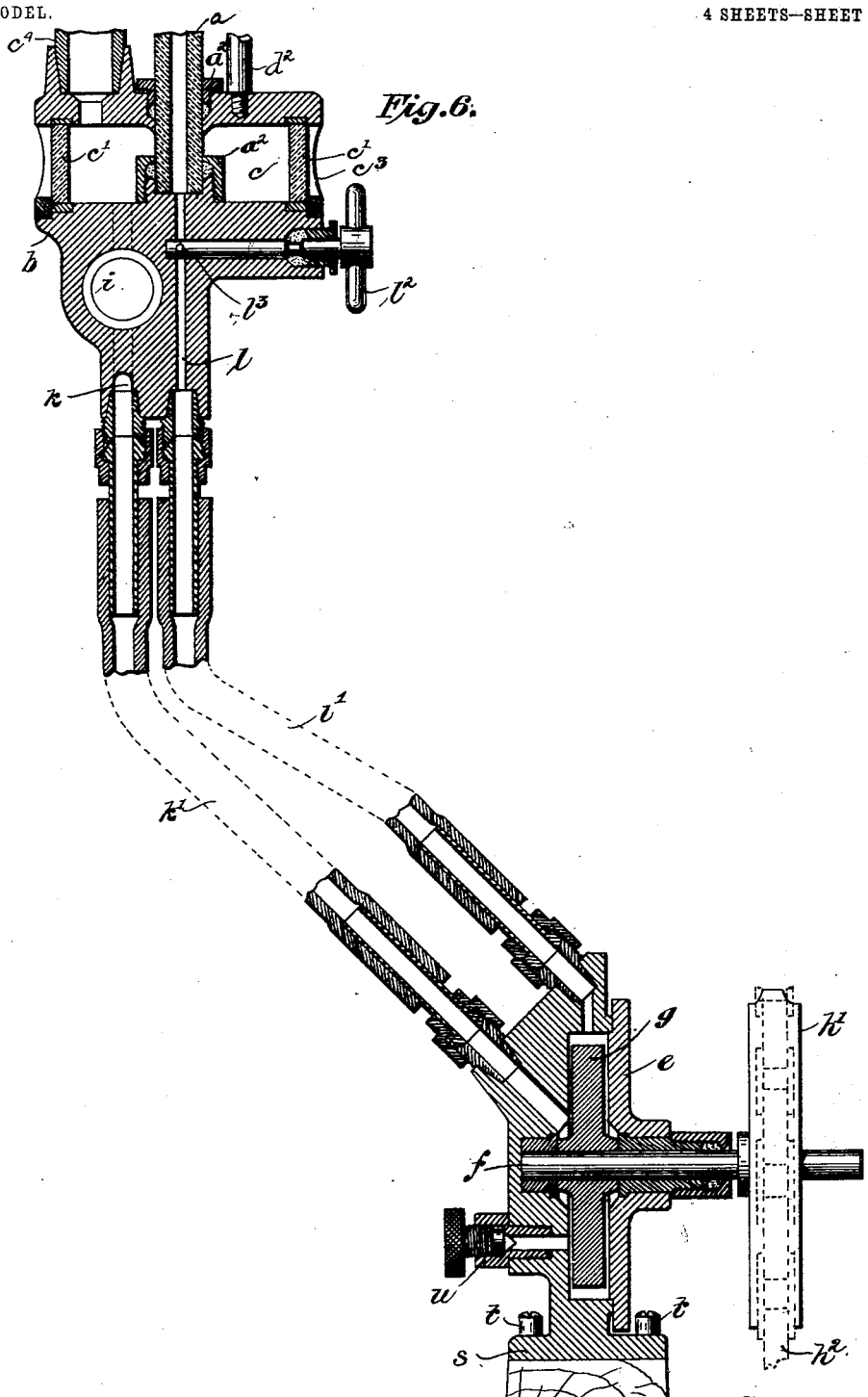

No. 733,358. PATENTED JULY 7, 1903.
C. H. VEEDER.
TACHOMETER.
APPLICATION FILED FEB. 18, 1903.
NO MODEL. 4 SHEETS—SHEET 4.
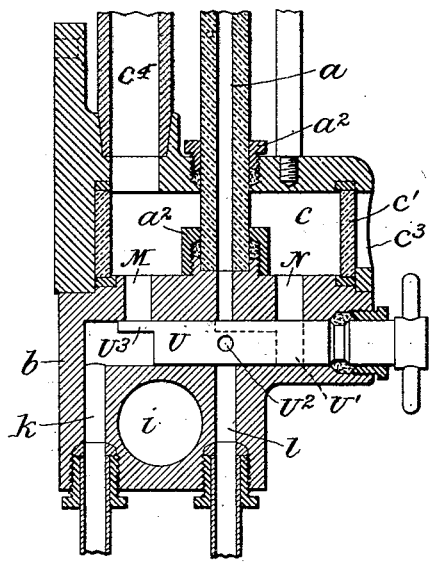
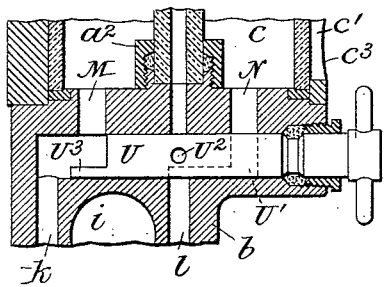
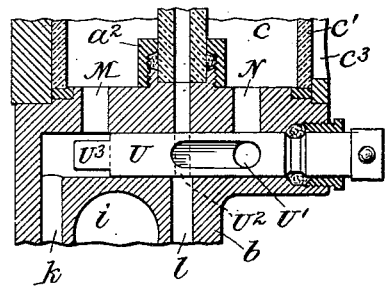

No. 733,358. Patented July 7, 1903.

UNITED STATES PATENT OFFICE.

CURTIS HUSSEY VEEDER, OF HARTFORD, CONNECTICUT.

TACHOMETER.

SPECIFICATION forming part of Letters Patent No. 733,358, dated July 7, 1903.

Application filed February 18, 1903. Serial No. 143,935. (No model.)

*To all whom it may concern:*

Be it known that I, CURTIS HUSSEY VEEDER, a citizen of the United States, residing in Hartford, county of Hartford, in the State of Connecticut, have invented certain new and useful Improvements in Tachometers, of which the following is a specification, reference being had to the accompanying drawings, forming a part hereof.

This invention relates to apparatuses or instruments for measuring the speed of shafts, wheels, &c., and machines of various classes. In an application for Letters Patent of the United States filed by me on May 6, 1902, and serially numbered 106,130, there is illustrated and described a tachometer for measuring more particularly the speed of motor-vehicles and in which the difference in the level of two communicating columns of liquid placed side by side indicates the speed at which the machine to which said tachometer is attached is being driven. When said tachometer is in a vertical position, the level of the liquid in the indicator-tube (one of the columns of liquid) and the level of the liquid in a reservoir (the other of the columns of liquid) will mark the zero of the speed-indicating scale; but if for any reason the tachometer is tilted, as will often be the case with a portable tachometer, the liquid in the indicator-tube will either be depressed or raised above its normal position, according to the degree and direction of the tilting and according to the distance between the indicator-tube and reservoir, as will be clearly seen upon reference to the aforesaid application. Slight variations from true readings will also occur when the velocity of the instrument changes suddenly either in rate or direction, as will often happen to instruments mounted on automobiles. Such variations are due to the inertia of the liquid and are especially noticeable when the changes of velocity occur in the plane of the two columns of liquid. While the tachometer described in said application gives accurate results in most cases where the instrument is vertically disposed and results sufficiently accurate for most purposes, notwithstanding the inertia of the liquid, and though the instrument be slightly tilted from a vertical position, such as would occur when it is mounted on a motor-vehicle, still for certain purposes the instrument should be made to read with the greatest possible accuracy under all conditions.

Accordingly one object of the present invention is to provide a tachometer of the class described which shall be so constructed that the errors in the reading of the instrument due to tilting and inertia may be minimized.

A further object of the invention is to provide for such disposition of the outlet or discharge pipe of the pump, which communicates with the indicator-tube, that the pump may be run in either direction with the same effect upon the liquid in the instrument—that is, with a like displacement of the liquid in either case for the same speed of rotation. In order to carry out this object of the invention, said outlet-pipe is radially disposed with respect to the pump-propeller.

A still further object of the invention is to provide means for adjusting the level of the liquid in the indicator-tube with reference to the graduated scale, whereby when the instrument is first filled for use or when from time to time the liquid is replenished the column of liquid in the indicator-tube may be quickly and accurately set to correspond with the scale.

In the drawings, wherein is illustrated an instrument which embodies the present invention, Figure 1 is a view in front elevation of said instrument. Fig. 2 is a detail view, partly in elevation and partly in section, on the plane indicated by the line 2 2 of Fig. 3, the pump-casing being partly broken away to show the interior construction of the pump. Fig. 3 is a view in central vertical section taken on the plane indicated by the broken line 3 3 in Fig. 1. Fig. 4 is a top view. Fig. 5 is a detail view taken on the plane indicated by the broken line 5 5 in Fig. 3. Fig. 6 is a view, partly in section and partly in elevation, showing the indicating mechanism located at a distance from the pump, communication being established between the indicating mechanism and the pump by suitable pipes. Figs. 7, 8, and 9 are detailed views, partly in section, illustrating different positions of a valve which may be used in connection with the device.

As stated above, the form of tachometer shown and described in said application has a liquid-reservoir and an indicator-tube placed side by side. In order to provide against any inaccuracies of measurement, which, as heretofore shown, might arise when that form of tachometer is tilted from a vertical position, the indicator-tube according to the present invention is disposed concentrically with respect to the reservoir instead of at one side thereof, as in the old form. In the drawings the indicator-tube $a$ is shown as mounted upon the base $b$ at the center of the reservoir $c$, which is also formed upon base $b$. The sides $c'$ of the reservoir are parallel and symmetrical with the axis or center line of the indicator-tube, and they are preferably of glass in order that the condition of the liquid in the reservoir may be conveniently observed from time to time, sight-holes being provided in the metallic exterior casing $c^3$ for this purpose. A filling-tube $c^4$, which may be regarded as a continuation of the reservoir and which communicates therewith through the top, is secured to the indicator-tube $a$ by a bracket $d$, which is tapped to form a passage $d'$, communicating with both tubes in order that the pressure upon the surface of the liquid in both the indicator-tube and the reservoir may be equal. A guard-rod $d^2$ extends from the top of the reservoir to the bracket $d$ to protect the indicator-tube, which is preferably formed of glass throughout. A packing-ring $a'$ and thumb-nuts $a^2$ are provided to secure the indicator-tube readily in position and to permit it to be easily and quickly removed and a new tube inserted whenever desirable.

As was the case in the old form of tachometer, which has been referred to, the indicating devices just described may be mounted directly upon the pump-casing, Figs. 1 and 3, which in such case serves as a support for said indicating devices, or the pump and the indicating devices may be separated, Fig. 6, the pump being placed near the moving part the speed of which is to be measured and the indicating devices located in a place where they may be conveniently observed. Different conditions of use will determine in which manner it will be the more convenient to unite the pump and indicating devices. For portable instruments it will as a rule be preferable to mount the indicating devices directly upon the pump in some such manner as is illustrated in Figs. 1 and 3 of the drawings, while for use on automobiles, for example, it will generally be the more convenient to separate the pump and indicating devices in order to place the pump near one of the vehicle-wheels and the indicating device on or near the dashboard in front of the driver. In the form shown in Figs. 1 and 3 a portion of the pump-casing $e$ is formed integral with the base $b$ of the indicating devices, said base and casing being tapped to form passages connecting the suction of the pump with the reservoir and the discharge of the pump with the indicator-tube. It will be obvious, however, that aside from the mere question of convenience there will be some cases where the pump will be required to be separated from the indicating devices— as, for instance, where the pump is required to be set up in a particular position, conceivably at a considerable inclination, in order to be properly connected to the moving or actuating part. Inasmuch as the indicator-tube should always be as nearly as possible in a vertical position, for reasons above stated, it will be necessary in such cases that the pump and indicating devices be separable, as will readily be seen. As illustrated in Fig. 6, the pump and indicating devices are thus removed from each other and communicate through suitable pipes $k'$ and $l'$. It should be observed here that when the instrument is set up for use the liquid-conduits connecting the pump to the reservoir and indicator-tube—that is, the pipes or passages $k$, $k'$, $l$, and $l'$—should head upwardly at all points and be substantially uniform throughout to prevent the formation of pockets where bubbles might collect in the liquid.

Any form of pump may be used in said tachometer which is capable of displacing the liquid therein to cause a change of level of the liquid of the reservoir without, however, actually causing a positive transfer of the liquid from the reservoir to the indicator-tube. The pump employed in the present case to bring about this result comprises a suitable shell or casing $e$, before referred to, having suitable bearings for a shaft $f$, upon which blades or paddles $g$ are mounted to rotate freely within the casing $e$. In said casing there is a draw-off cock $u$, through which a quantity of liquid may be removed in order to bring the level of the liquid to the zero of the scale when filling the instrument and through which the instrument may be completely emptied when it is desired. The shaft of the pump may be connected mechanically in any suitable way with the moving or actuating part, the means shown in Figs. 3 and 4 of the drawings comprising a pulley $h$, keyed upon said shaft and adapted to receive a belt or chain driven by said part, while the means shown in Fig. 6 comprise a sprocket-wheel $h'$ on the shaft, connected by a chain $h^2$ with the moving or actuating part.

In the casting constituting the base $b$ and a portion of the pump-casing $e$ a chamber $i$, Fig. 2, is formed, which communicates with the reservoir $c$ through a channel $j$ and with the suction of the pump through a channel $k$, communication being thus established between said reservoir and the suction of the pump. Said casting is also tapped to form a passage $l$ to connect the periphery or discharge of the pump with the indicator-tube $a$, and said passage, Fig. 5, is radially disposed with respect to the pump-propeller, so that when the pump is rotated at equal speeds in either direction the same displacement of the liquid in the instrument will take place.

It will therefore be obvious that the instrument will always be adapted to measure speed correctly without regard as to whether the pump is being run backward or forward. It is also desirable that the outlet $l$ be placed centrally with respect to the pump-chamber in order to reduce to a minimum the effect of eddies within the pump-chamber. A valve $l^3$, controlled by a handle $l^2$, is provided in said passage for regulating the movement of the liquid, and thereby to render the instrument more sensitive and to especially prevent the dancing of the liquid in the indicator-tube when the instrument is jarred.

The valve $l^3$ for regulating the resistance between the pump and the indicator-tube and a valve for controlling the connections between the reservoir, the pump, and the indicator-tube for filling, testing, or operating, combined in one structure, are represented in Figs. 7 to 9. A single valve-plug U has a seat in the base of the instrument and is provided with a channel U' to establish communication between the pipe $l$ and a passage N into the reservoir, a hole $U^2$ at right angles with the channel U' to establish communication between the pipe $l$ and the indicator-tube, and at its end with an ear $U^3$ to close the passage M from the reservoir to the pipe $k$. During the filling of the instrument the valve-plug U is in the position shown in Fig. 7, in which the passage M is closed, and communication between the reservoir and the indicator-tube is established through the channel U', thus allowing the liquid, which is introduced at the top of the reservoir extension, to enter the indicator-tube also, by which the quantity of liquid introduced is indicated. When the valve-plug is turned to either of the positions shown in Figs. 8 and 9, the liquid descends into the pipes and pump until they are properly filled. The valve-plug being then in the position shown in Fig. 8 the pump is started and the liquid is circulated from the reservoir, through the pump, and back to the reservoir to separate all air-bubbles from the liquid, the reservoir being at this time connected with the pipe $k$ through the passage M, which is open, and with the pipe $l$ through the passage N and channel U'. Finally during the operation of the instrument the valve-plug is in the position shown in Fig. 9, in which the passage M is open, the passage N is closed, and communication between the pipe $l$ and the indicator-tube is established through the hole $U^2$. By turning the valve-plug slightly from the position shown in Fig. 9, so as to place the hole $U^2$ slightly out of exact alinement with the pipe $l$ and indicator-tube, the resistance to the movement of liquid from the pump toward the indicator-tube may be varied. If at any time it is desired to test the instrument, even when the pump is in operation, the valve-plug is turned to the position shown in Fig. 7, thus cutting off both reservoir and indicating-tube from the pump.

Seated in the casting $b$ and adapted to be moved into and out of chamber $i$ therein is displacement-plunger $m$, Fig. 2, by which the area or capacity of said chamber $i$ may be varied, thereby raising or lowering the level of the liquid in the indicator-tube, as may be necessary in adjusting the instrument. Suitable packing $n$ and a packing-ring $o$ are provided around said plunger, being held in place by a nut $p$, threaded to the wall of the plunger-cavity. A thumb-screw $q$, held from longitudinal movement by engagement with the nut $p$, is threaded to the plunger, whereby the position of the latter with respect to the chamber $i$ may be adjusted to a nicety. A scale $r$ is secured to the instrument near the indicator-tube and is marked with proper graduations to correspond with the variations in height of the liquid in the indicator-tube, the height of the liquid in said tube, as will be readily understood, being approximately proportional to the square of the corresponding speed of the pump-propeller. If preferred, the graduations may be marked upon the indicator-tube itself.

The lower part of the instrument may be formed with a conveniently-shaped base $s$, provided with clamping-screws $t$ for securing it in position when used as a stationary instrument, as upon a vehicle or other machine.

The operation of the improved tachometer will be understood from the foregoing description. In filling the instrument a suitable liquid, such as colored alcohol, is introduced through the filling-tube $c^4$, a sufficient quantity of such liquid being supplied to bring the level of the same just above the zero-point of the scale. The level of the liquid is then roughly adjusted to the zero of the scale by means of a draw-off cock, and finally screw $q$ is turned to move the plunger to the precise position in chamber $i$ to set the level of the liquid in the indicator-tube exactly at zero. When these adjustments have been completed, the instrument is ready for use. As the vehicle or driven part is speeded up the column of liquid in the indicator-tube will be caused to change its level with reference to the liquid in the reservoir, so that if the scale is made to read up, as shown in Fig. 1, the column of liquid in the indicator-tube will rise, the amount of rise varying approximately with the square of the speed of the revolution of the pump. Of course the pump does not act positively to transfer the liquid from the reservoir to the indicator-tube; but the blades of the pump will slip more or less in the liquid, so that when the change in level of the two columns for the given speed has been attained no further movement of the liquid in the indicator-tube will take place, and the top of the column will remain at substantially the same height until a change in speed occurs. It will be evident that in an instrument constructed in accordance with the foregoing the errors in the readings due to tilting will be substantially eliminated, both for the reason that the pump and indicating mechanism are separable and because the concentrically-disposed indicator-tube will minimize any slight discrepancies from the true readings which might occur under unusual conditions. It will also be evident that the reversibility of the pump will obviate the necessity of changing the position of the instrument, as would otherwise be required when the speed of the moving part revolving backward is to be determined.

Various changes in the construction and arrangement of parts can be made to suit the conditions of use; but such changes will obviously fall within the scope of this invention, which is not limited to the precise construction shown and described.

I claim as my invention—

1. A speed-indicator comprising a liquid-reservoir, an indicator-tube concentrically disposed with respect to said reservoir, and a pump interposed between the reservoir and the indicator-tube, substantially as described.

2. A speed-indicator comprising a liquid-reservoir, an indicator-tube concentrically disposed with respect to said reservoir, and a centrifugal pump, the reservoir being connected with the suction of the pump and the indicator-tube being connected with the discharge of the pump, substantially as described.

3. A speed-indicator comprising a liquid-reservoir, an indicator-tube concentrically disposed with respect to said reservoir, a pump interposed between the reservoir and the indicator-tube and an adjusting-valve interposed between the pump and the indicator-tube, substantially as described.

4. A speed-indicator comprising a liquid-reservoir, an indicator-tube concentrically disposed with respect to said reservoir, a pump interposed between the reservoir and the indicator-tube, one of said parts being connected to the suction and the other to the discharge of the pump, and an adjusting-valve interposed between the pump and the indicator-tube, substantially as described.

5. A speed-indicator, comprising a liquid-reservoir, an indicator-tube, a base upon which said reservoir and tube are mounted and having therein a chamber, a pump, the reservoir and chamber communicating with the indicator-tube through the pump and a plunger adapted to be moved in and out of said chamber, substantially as described.

6. A speed-indicator comprising a liquid-reservoir, an indicator-tube, a base upon which said reservoir and tube are mounted and having therein a chamber, a pump, the reservoir and chamber communicating with the indicator-tube through the pump and a plunger adapted to be moved in and out of said chamber, a nut engaging said base, and a thumb-screw held from longitudinal movement by engagement with the nut and having a threaded engagement with the plunger, substantially as described.

7. A speed-indicator comprising a liquid-reservoir, an indicator-tube, a base upon which said reservoir and tube are mounted and having therein a chamber, a pump, the reservoir and chamber communicating with the indicator-tube through the pump and a plunger adapted to be moved in and out of said chamber, packing surrounding said plunger, a packing-ring also surrounding said plunger, and a threaded nut engaging said base and coöperating with said packing-ring, substantially as described.

8. A speed-indicator comprising a liquid-reservoir, an indicator-tube, a base supporting said reservoir and tube, said base having a chamber communicating with the reservoir, a valve located in said base to regulate the movement of the liquid into said tube, a pump interposed between but separated from said reservoir and tube, and pipes connecting said reservoir and tube with the pump, whereby the pump may be tilted without affecting the indicating mechanism, substantially as described.

9. A speed-indicator comprising a liquid-reservoir, an indicator-tube, a base supporting said reservoir and tube, said base having a chamber communicating with the reservoir, a plunger adapted to be moved in and out of said chamber, a pump interposed between but separated from said reservoir and tube, and pipes leading upward at all points connecting said reservoir and tube with the pump, whereby the pump may be tilted without affecting the indicating mechanism, substantially as described.

10. A speed-indicator, comprising a liquid-reservoir, an indicator-tube, a base supporting said reservoir and tube, said base having a chamber communicating with the reservoir, a valve located in said base to regulate the movement of the liquid into said tube, a pump separated from said reservoir and tube, a pipe connecting said reservoir with the suction of the pump, a pipe connecting said indicator-tube with the discharge of the pump whereby the pump may be tilted without affecting the indicating mechanism and a draw-off cock in the pump-casing, substantially as described.

11. A speed-indicator comprising a liquid-reservoir, an indicator-tube concentrically disposed with reference to the reservoir, a base supporting said reservoir and tube, a pump interposed between but separated from said reservoir and tube, pipes connecting said reservoir and tube with the pump, whereby the pump may be tilted without affecting the indicating mechanism, and a circulating-valve located in said base and arranged to control the communication between said pipes and said reservoir and tube, whereby the liquid may be circulated between the pump and the reservoir and whereby the reservoir and the tube may be independently connected with said pipes, substantially as described.

12. A speed-indicator, comprising a liquid-reservoir, an indicator-tube concentrically disposed with respect to said reservoir, a pump separated from said reservoir and tube, and pipes connecting said reservoir and tube with the pump, whereby the pump may be tilted without affecting the indicating mechanism, substantially as described.

13. A speed-indicator comprising a liquid-reservoir, an indicator-tube, and a pump interposed between said reservoir and tube and having a radially-disposed discharge-outlet in its periphery and connected with the indicator-tube, substantially as described.

14. A speed-indicator, comprising a liquid-reservoir, an indicator-tube, and a pump having a radially and centrally disposed outlet in the periphery of its wall, the reservoir being connected with the suction and the indicator-tube with the discharge of the pump, substantially as described.

15. A speed-indicator comprising a liquid-reservoir, an indicator-tube concentrically disposed with respect to said reservoir, a pump separated from said reservoir and tube, a pipe connecting said reservoir with the suction of the pump and a pipe connecting said indicator-tube with the discharge of the pump, whereby the pump may be tilted without affecting the indicating mechanism, substantially as described.

16. A speed-indicator comprising a liquid-reservoir, an indicator-tube, a pump separated from said reservoir and tube and having a radially-disposed discharge-pipe opening from its periphery, the reservoir being connected with the suction and the indicating-tube with the discharge of the pump, whereby the pump may be run in either direction and may be tilted without affecting the indicating mechanism, substantially as described.

17. A speed-indicator, comprising a liquid-reservoir, an indicator-tube, a pump interposed between the reservoir and indicator-tube, and a valve-plug interposed in the connections between the reservoir, indicator-tube and pump whereby communication may be established or cut off between the reservoir, indicator-tube and pump and whereby resistance may be interposed between the pump and indicator-tube to check the vibration of the liquid, substantially as described.

18. A speed-indicator, comprising a liquid-reservoir, an indicator-tube, a pump interposed between the reservoir and indicator-tube, and a valve-plug interposed in the connections between the reservoir, indicator-tube and pump and having a channel to connect the discharge of the pump and the indicator-tube, a second channel to connect the discharge of the pump and the reservoir and a projection to establish or cut off communication between the reservoir and the suction of the pump whereby communication may be established or cut off between the reservoir, indicator-tube and pump and whereby resistance may be interposed between the pump and indicator-tube to check the vibration of the liquid, substantially as described.

This specification signed and witnessed this 22d day of January, A. D. 1903.

CURTIS HUSSEY VEEDER.

In presence of—
E. BARRIE SMITH,
W. B. DUNNING.